United States Patent [19]

Neuman

[11] 3,945,678

[45] Mar. 23, 1976

[54] HARNESS FOR SAFETY SHIELD TYPE CHILDREN'S CAR SEAT

[76] Inventor: Lewis A. Neuman, 45 Duke Drive, Paramus, N.J. 07652

[22] Filed: Sept. 27, 1974

[21] Appl. No.: 509,969

[52] U.S. Cl. .................. 297/390; 119/96; 297/385
[51] Int. Cl.² ........................................ B60R 21/02
[58] Field of Search ........ 119/96, 29; 297/384, 385, 297/390, 250, 253, 254, 216; 280/290; 244/121, 122 R, 122 AG, 122 B

[56] References Cited
UNITED STATES PATENTS

| 579,818 | 3/1897 | Cooley | 119/96 |
| 1,316,163 | 9/1919 | Kennedy | 119/96 |

*Primary Examiner*—Louis G. Mancene
*Assistant Examiner*—Peter K. Skiff
*Attorney, Agent, or Firm*—Thomas Langer

[57] ABSTRACT

This invention relates to a harness, which when used in conjunction with a safety shield type children's car seat, prevents a child from standing or climbing out of the seat, while under most short stop conditions does not restrain the forward motion of the child.

9 Claims, 4 Drawing Figures

HARNESS FOR SAFETY SHIELD TYPE CHILDREN'S CAR SEAT

Children's car seats which use a safety shield to restrain a child's forward motion under impact, have been found to be the safest of the children's car seats. They are generally suggested for use by children between the ages of 1 and 5 years. During impact or short stop conditions, the safety shield design insures that the impact load is widely distributed over large areas of a child's body. But this design feature assumes and depends upon the fact that the child is seated. Yet certain of these car seats are constructed in such a fashion as to allow a normally active child to stand in these car seats, or even to climb out of them. A harness could be used to keep the child seated.

Conventional child automobile harnesses can not be used in conjunction with a safety shield car seat for several reasons. One such harness must be attached to the automobile seat belt, but this same seat belt is used to hold the safety shield car seats in place. Other harnesses are secured to rear portions of children's car seats, and yet safety shield car seats may have no rear portion. Moreover, present automobile harnesses secure the child from the rear and therefore are inappropriate for use with a safety shield car seat. Under impact or short stop conditions, they would restrain the child's motion, thereby preventing the child from realizing the full benefit of the safety shield design.

An object of this invention is to provide a harness, which when used in conjunction with a safety shield type children's car seat, prevents a child from standing in the seat or climbing out of it, but under most short stop conditions does not restrain the forward motion of the child.

A further object of this invention is to provide a harness which can be adjusted to a child's size and is equally as effective over the range of sizes of children that can be expected to use the car seats.

Still a further object of this invention is to provide a harness, which when used with a Ford "Tot Guard" car seat, can be detachably secured to the Tot Guard, without changing the Tot Guard's structure.

Figure 1:
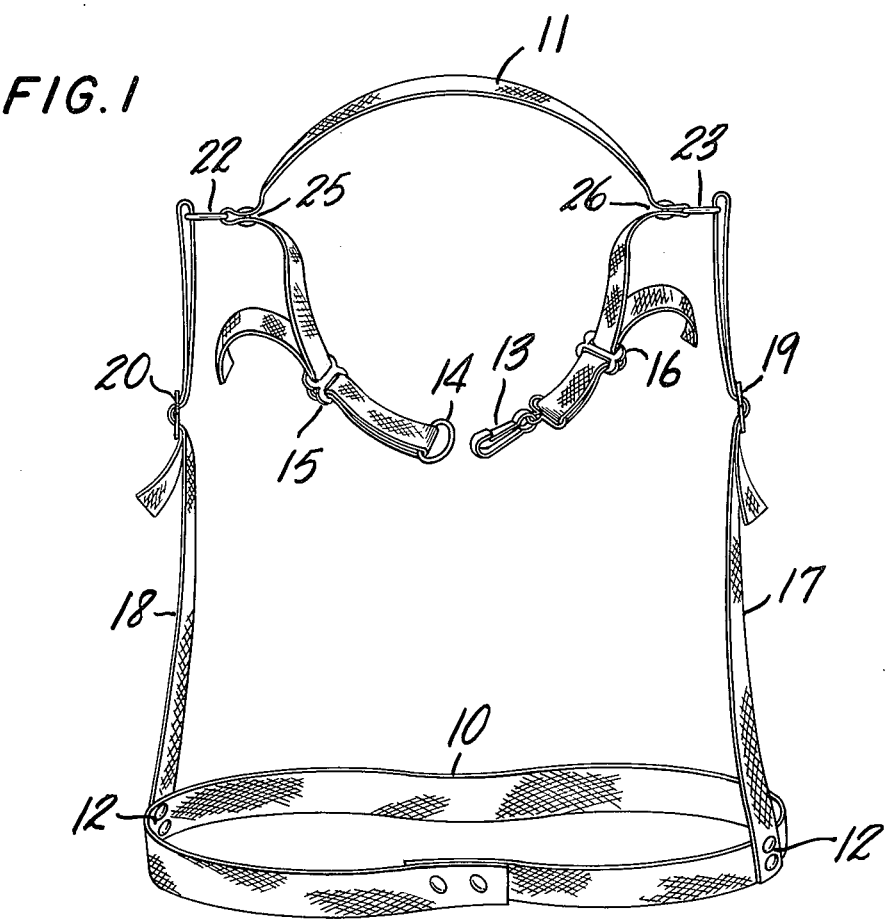
FIG. 1 shows an embodiment of the harness.
Figure 2:
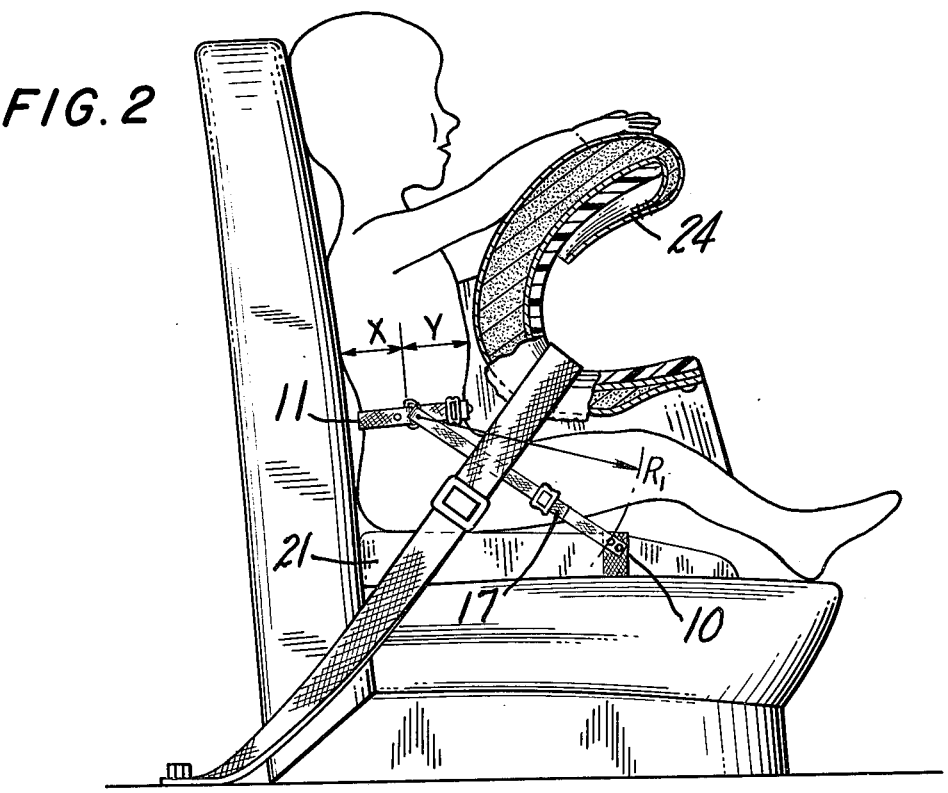
FIG. 2 is a cutaway drawing of a child wearing the embodiment of FIG. 1, sitting in a relaxed position in one of the safety shield type of children's car seats, the Ford Tot Guard.

FIG. 1 shows in detail, an embodiment of the harness. FIG. 2 shows a 6 year old 50 pound child, the largest child recommended for the Tot Guard, seated in a Tot Guard and wearing the embodiment of the harness shown in FIG. 1. The larger the child and therefore the greater its momentum under impact, the greater the forward motion of the child. The largest child expected to use the car seat would therefore place the most severe test on the condition that the harness not restrain the child's forward motion.

Band 10 is slipped over the seat portion 21 of the Tot Guard and is too small to be forced more than four inches up the taper of the seat Belt 11 is attached to the child with a clasp 13 and D ring 14, as seen in FIG. 1. The belt is adjustable to the size of the child's waist using slip fasteners 15 and 16. Belt 11 is attached to band 10 by straps 17 and 18, which can be adjusted to the child's size using slip fasteners 19 and 20. Straps 17 and 18 are attached to band 10 with rivets 12 and are fastened to belt 11 through D rings 22 and 23. D rings 22 and 23 are fastened with rivets 25 and 26, to belt 11, seven inches or less apart. Allowing ½ inch offset for D rings 22 and 23, the ends of straps 17 and 18 are kept on or to the rear of the centerline of a child's waist, if a smallest probable waist of 16 inches is assumed. Therefore, in FIG. 2, $x$ will always be equal to or smaller than $y$. For optimum safety, D rings 22 and 23 would be fastened adjacent to each other.

Figure 3:
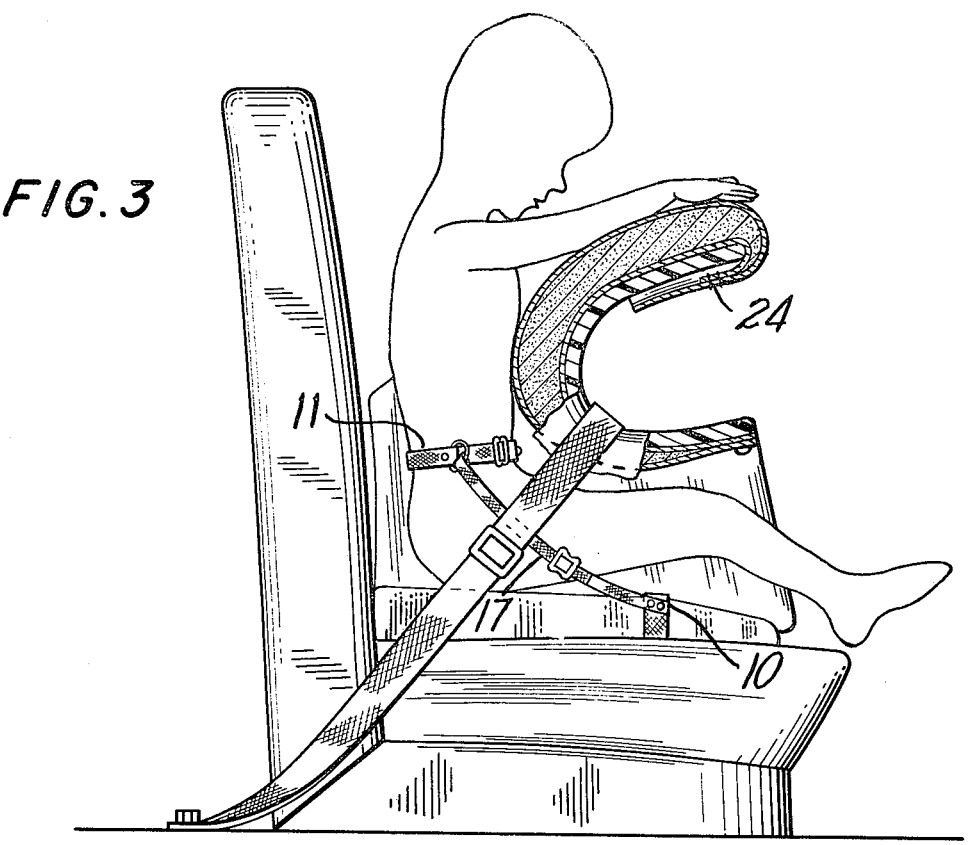
FIG. 3 is a cutaway drawing of a child wearing the embodiment of FIG. 1, restrained by the Ford Tot Guard after being thrown forward under mild impact conditions.
Figure 4:
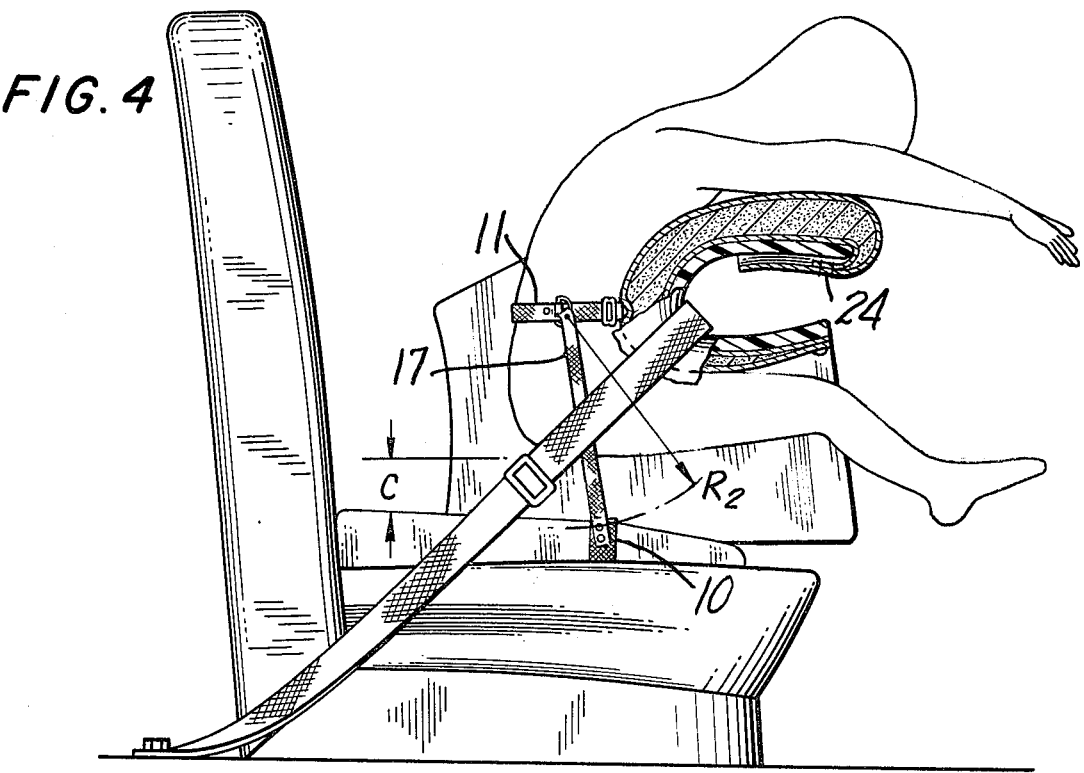
FIG. 4 is a cutaway drawing of a child wearing the embodiment of FIG. 1, restrained by the Ford Tot Guard after being thrown forward under severe impact conditions.

In FIG. 2, the harness can be seen to restrain the child from standing or climbing out of the car seat assembly 21 and 24. FIG. 3 shows that under slight impact, the harness does not restrain the forward motion of the child; on the contrary, the harness slackens. FIG. 4 shows a fifty pound child thrown forward under the severe impact conditions of a 30 mph crash. The distance $R2$ between strap 17's points of connection to band 10 and belt 11, is not greater than the length $R1$ of strap 17 in FIG. 2. Therefore in FIG. 4, the harness is not restraining the forward motion of the child.

The smaller the child, and therefore the smaller the movement of the child and the seat 24, the smaller the distance $R2$ becomes, and therefore the further the harness comes from restraining the forward motion of the child. Moreover, the larger the child's waistline, and therefore the further back from the waist's centerline that straps 17 and 18 are fastened, the longer $R1$ becomes and thus again the further the harness comes from restraining the forward motion of the child. Therefore, the design of the harness is such that even though children's weights vary, different design aspects maintain the safety of the harness. Furthermore, under more severe impact conditions than those shown in FIG. 4, or if the harness and seat were to be used by a child whose size is greater than the recommended limits, the harness will pull up seat 21 through length $c$ while exerting only a minimal force, the inertial force of seat 21, on the child.

In use, band 10 is slipped as far as it will go up the seat portion 21 of the car seat. The child is then seated and clasps 13 and 14 are joined. At the time of first use, or when adjustments are needed, belt 11 is evenly adjusted to the child's waist using both fixtures 15 and 16. Slack is taken out of straps 17 and 18 using fixtures 19 and 20.

While I have illustrated and described a typical embodiment of my invention, it is to be understood that I do not limit myself to the precise construction herein disclosed and the right is reserved to all changes and modifications coming within the scope of the invention as defined in the appended claims.

Having thus described my invention, what I claim as new is:

1. A harness for restricting the vertical movement of a child seated on a cushion of a safety car seat having a protective front shield, said harness comprising:
   a. an openable waist-encircling belt adapted to fit relatively snugly about the child's waist;

b. at least one strap having one of its two ends attached to said belt; and c. a securing means attached to said safety car seat in front of the vertical center line of the child's upper torso and connected to the other strap end for securing said belt to the safety car seat.

2. The harness of claim 1, wherein said securing means is attached to said cushion.

3. The harness of claim 2, having at least the forward portion of said cushion tapered toward the front, and wherein said securing means comprises a laterally extending loop of a size adapted to fit snugly around a predetermined tapered portion of said cushion.

4. The harness of claim 3, wherein said at least one strap comprises two laterally spaced straps attached to said belt generally opposite each other.

5. The harness of claim 4, wherein said straps are attached to said belt nearer to the rear of the seat than to the front.

6. The harness of claim 5, wherein the size of said belt and the length of said straps are adjustable.

7. The harness of claim 1, wherein said securing means is attached to said safety car seat substantially below the child's waist.

8. The harness of claim 7, wherein said at least one strap comprises two laterally spaced straps which are attached to the belt nearer the rear of the seat than to the front.

9. The harness of claim 1, wherein said at least one strap comprises two laterally spaced straps which are attached to the belt nearer the rear of the seat than the front.

* * * * *